United States Patent [19]

Gifford

[11] Patent Number: 5,261,276
[45] Date of Patent: Nov. 16, 1993

[54] FUEL OIL MONITOR SYSTEM AND METHOD

[76] Inventor: Henry Gifford, 230 Riverside Dr. #11C, New York, N.Y. 10025

[21] Appl. No.: 44,374

[22] Filed: Apr. 7, 1993

Related U.S. Application Data

[63] Continuation of Ser. No. 878,337, May 4, 1992, abandoned.

[51] Int. Cl.⁵ .................. G01F 23/14; G01M 3/02
[52] U.S. Cl. .................................. 73/302; 73/299; 73/41.2
[58] Field of Search .............. 73/299, 300, 301, 302, 73/41.2, 49.1; 379/90, 99, 106, 107

[56] References Cited

U.S. PATENT DOCUMENTS

| | | | |
|---|---|---|---|
| 2,003,759 | 6/1935 | Reichel . | |
| 3,872,725 | 3/1975 | Wojewski | 73/301 |
| 4,006,636 | 2/1977 | Holmen | 73/302 |
| 4,064,752 | 12/1977 | Murphey, Jr. | 73/302 |
| 4,147,893 | 4/1979 | Matson . | |
| 4,199,983 | 4/1980 | Kobayashi et al. . | |
| 4,454,760 | 6/1984 | Carlisle . | |
| 4,474,054 | 10/1984 | Ainlay | 73/302 |
| 4,625,548 | 12/1986 | Charter | 73/302 |
| 4,649,739 | 3/1987 | Horner | 73/302 |
| 4,840,056 | 6/1989 | Fernandez et al. | 73/302 |
| 4,845,486 | 7/1989 | Knight et al. . | |
| 5,059,954 | 10/1991 | Beldham | 73/301 |
| 5,060,512 | 10/1991 | Kanashige et al. | 73/301 |
| 5,105,662 | 4/1992 | Marsh et al. | 73/299 |

FOREIGN PATENT DOCUMENTS

| | | | |
|---|---|---|---|
| 1156575 | 2/1961 | Fed. Rep. of Germany | 73/299 |
| 60-210724 | 10/1985 | Japan | 73/302 |
| 63-3225 | 1/1988 | Japan | 73/299 |
| 2-259428 | 10/1990 | Japan | 73/299 |
| 608059 | 4/1978 | U.S.S.R. | 73/301 |

OTHER PUBLICATIONS

King Engineering Corp., Supplement #1200, "Purge Control Gauging System".
Scully, Robert, "Monitor Propane-The Scul-Tel® System: smart technology for . . . ".
Petrometer Corp., "Petrometer's Liquid Level Measurement System Basically Consists of Four Parts", pp. 4,5 and 8.

Primary Examiner—William A. Cuchlinski, Jr.
Assistant Examiner—G. Bradley Bennett
Attorney, Agent, or Firm—Richard P. Crowley

[57] ABSTRACT

A system and method for providing for a remote readout of liquid levels in an oil tank, which system includes an oil tank having an air vent and containing liquid amounts whose levels are to be determined; a single bubble tube inserted in the oil tank, with one end adjacent the bottom surface of the oil tank; an integral source of compressed air for supply to the single bubble tube; a pressure sensor and a timer actuated on demand or periodically at a fixed time, to actuate the integral air compressor for a short defined time period, and immediately thereafter to actuate the pressure sensor, to sense the amount or level of the oil in the oil tank; manual or telephone actuation of the timer, when determination of the amount or level of the oil in the oil tank is desired; and a computer-memory and display means at a remote location, to receive and display to the user the information on the amount or level of oil in the oil tank.

19 Claims, 1 Drawing Sheet

FUEL OIL MONITOR SYSTEM AND METHOD

This is a continuation of copending application Ser. No. 07/878,337, filed on May 4, 1992, now abandoned.

BACKGROUND OF THE INVENTION

It is most desirable to provide for a device that can be read on demand or at fixed intervals, to determine the level; for example, percent filled or height, or amount; for example, volume, such as gallons, of liquid in a receptacle, such as oil in an oil tank, in order to determine, for example, the accurate amount of oil being delivered or the amount of oil being used from time to time. There are a wide variety of systems for determining the amount and level of oil in an oil tank; however, such systems typically are quite expensive, particularly where sold with an inventory capability. Other systems require the emptying of the tank for the installation of the system. Some systems are devised merely to notify the user when the oil level in a tank drops to a predetermined low point, so that the tank then may be refilled; however, such systems usually have no inventory capability and are alarm-actuated-type systems. Other systems employ a simple hand-pumped manometer installed on oil tanks which generally are not read regularly, because of the need for a user to go to the tank for a direct reading, to obtain the necessary information, and which pump petrometers or manometers are not wholly accurate. Other systems require the continuous supply of air to a tank, in order to provide for reading, while other systems require the employment of two separate tubes in the oil tank with a continuous or intermittent air supply.

It is, therefore, desirable to provide a system and method for a reasonably priced, easily installed and accurate system and method capable of performing inventory and remotely transmitting this information, either on demand or at periodic timed intervals, to a remote location.

SUMMARY OF THE INVENTION

The invention relates to a system and method for determining the amount or level of liquid in a receptacle directly or from a remote location, and more particularly relates to a system and method for determining the amount or level of oil in an oil tank from a remote location, and providing an inventory record of such information.

The system and method of the invention are directed to the determination of the amount or level particularly of oil in an oil tank, by the intermittent operation of an air supply to a single bubble tube installed on the oil tank, and employing an integral air supply, providing for sensing information from a pressure sensor connected to the single tube to be transmitted directly or remotely, for example, via telephone lines, to a computer with a memory and display system. The system and method provide for the air supply, on demand or periodically at a defined time period, to be introduced into the easily installed, single bubble tube for a defined purge time period, and, directly thereafter, or after a short delay; for example, up to 5 minutes such as 10-60 seconds, the static pressure is sensed and converted and directly displayed or sent to a remote location for display or inventory.

The system and method of the invention overcome many of the disadvantages relating to prior-art systems and methods, and provide for a reasonably priced, accurate and easily installed system and method capable of performing inventory and display for one or more receptacles at a direct or remote location, either on demand or at defined time periods, so as to monitor more accurately the delivery, for example, of oil to an oil tank, or the usage of oil over any defined time period, or to determine the correctness of oil delivery invoiced or used.

The invention comprises a system for determining the amount or level of liquid in a receptacle, and which system comprises in combination a receptacle, such as an oil tank, having an air vent therein and containing a quantity of liquid, such as oil, whose amount or level in the receptacle is to be determined by the system. The system includes a single bubble tube, typically a copper tube, having a one and another end, the one end open and disposed within and near the bottom surface of the receptacle, and an integral source of compressed air, such as an integral, electrically powered, small air compressor, the said air compressor connected to the other end of the single bubble tube, so as to provide air, on demand or at defined time periods, to the one end of the single bubble tube positioned within the receptacle, so as to purge periodically the liquid from the single bubble tube and permit the passage of bubbles from the one end thereof, and which air is then vented from the vent of the receptacle. The system includes a pressure-sensor means, such as a hydrostatic or pressure sensor, connected to the single bubble tube, to sense the hydrostatic pressure in the single bubble tube, after the tube has been purged by the passage of air bubbles therethrough by the air compressor, and to send a sensing signal, typically through an electronic circuity means, to convert the sensing signal into an electrical signal, representing information on the level or amount of liquid in the receptacle. The pressure sensor may be converted to a readout signal for display at the tank location, or may be converted at the remote location for display or inventory.

The system includes a timing means, such as an electrically actuated timer, which on demand, such as by the use of a manually powered switch, or on demand by a remote electrical trigger signal over a telephone line, actuates for a fixed time the air compressor for a short defined time period; for example, but not limited to, 1 second to 30 seconds, as required, to purge the single bubble tube of the liquid contained therein, and to pass the air through the one end of the tube, to purge all liquid from the line. The timer also actuates immediately, after the defined time period, the pressure-sensor means, to determine the hydrostatic pressure in the single bubble tube, and, therefore, to obtain a pressure-sensor signal representative of the amount or level of the liquid, such as oil, in the receptacle or oil tank. The timing means, such as the electrical actuated timer, may be actuated by the user by a manual switch or actuated by an electrical signal sent over a telephone line at a periodic time interval, so as to provide for periodic monitoring and determining of the level or amount of liquid in the receptacle; for example, once every 24 hours at midnight or once a week, or other such time periods.

The system includes a means to receive and display to the user the information on the amount or level of the liquid in the receptacle, and which means to receive and display may be positioned adjacent to the receptacle, or more typically is positioned at a location remote from the receptacle, so that, for example, a large number of receptacles may be monitored by a central monitoring system, such as an oil supplier. The information from the pressure-sensor means is, therefore, transmitted and displayed directly on a display adjacent the oil tank for immediate display to the user, or, optionally and preferably, also is transmitted over the telephone line to a central computer with a memory and display, so that, based on the signal received and converted, the amount or level of oil in the tank may be displayed, for example, on a cathode-ray-tube screen, or stored in memory and, on demand, displayed by a printout.

Typically, the system is directed to an oil tank, wherein the means to receive and display the information from the pressure sensor is at a location remote from the receptacle, such as a central monitoring location, for a plurality of tanks. Thus, in one preferred embodiment, the system would include a telephone line between a central station and each of the receptacles to be monitored, a modem connected to the telephone line, and a computer with a memory connected to the modem, to receive a sensing signal from the pressure-sensor means, and timing means connected to the modem to actuate the integral air compressor at each location for a defined time period, and to actuate the pressure-sensor means, whereby the system thus may be activated automatically by a timing signal sent over the telephone lines, and the pressure-sensor signal received by the computer means over the telephone lines at the end of the defined time period.

The method of the invention is directed to a determination of the amount or level of liquid, such as oil, in a receptacle, such as an oil tank, and which method comprises inserting the open end of a single bubble tube into a vented receptacle, such as an oil tank, having a liquid, such as oil, whose level or amount is to be determined by a user, the open end of the single bubble tube placed adjacent or near the bottom of the receptacle. The method includes periodically, on demand or at preset timed intervals, introducing air from an integral air compressor into the single bubble tube for a short defined time period to purge the tube, with the air bubbles from the one end of the single bubble tube rising through the tank and being vented out the vent of the receptacle. The method includes detecting the hydrostatic pressure in the single bubble tube through a pressure sensor immediately after the defined purge time period. The sensing signal received from the pressure sensor is then converted into an electrical signal, representing information on the amount or level of liquid in the tank, and is transmitted via telephone lines to a location remote from the location of the receptacle or oil tank. The information thus received is received by a computer having a memory and display, and permits the display of the information on demand, or storage of the information in memory and display and printout of the information as desired.

Thus, the invention relates to the combination of a system and method of an intermittent integral air supply, a single bubble tube, an electronic pressure sensor sensitive enough to be used for inventory purposes, and transmission of the information to a remote location, such as over telephone lines, for display and inventory purposes. The system permits easy installation, either as the system, per se, or easy installation into a typical existing oil tank equipped with a single, bubble-tube, manual manometer, by the installation of the telephone-line modem, memory-display, sensor-signal circuits, a pressure sensor to the integral air compressor and the timer. In the system, the pressure/gallons-level calculations can be done by the system near the receptacle to be tested, or the information over the telephone lines computed by the computer back at the remote location, based on transmitting only the pressure-sensor signal over the telephone lines, which is preferable and which would save the cost of supplying a system at each individual tank. However, where users want on-site reading capability, such a computer-calculation system also can be done, optionally, at the site location. The system also includes sending a pressure-sensor signal over a telephone line, having a computer at a central remote location do the necessary calculations, to provide for a gallon or level determination, and then retransmitting the gallon- or level-sensing signal back to the tank location for recordation or display; thus, providing an on-site reporting capability for the tank.

The system provides for a timing means; for example, an electronic timer, set to take a reading at designated hours; for example, at midnight for each night, and then to store and transmit the information on the level or amount of liquid in the receptacle. For example, this midnight information is quite useful for comparing to weather information which is typically measured midnight to midnight. The system also may communicate over telephone lines via an incoming telephone call only by a user, permitting use on a telephone line with no outgoing capability. This particular feature of the system appeals to customers who worry about use of the telephone line by an unauthorized person, where the telephone line has outgoing capabilities. The system may, for example, take periodic time readings as desired; for example, hourly, which hourly readings would, for example, closely bracket the delivery, eliminating the inaccuracy resulting from fuel consumed from midnight to midnight on the delivery date. The system also may be programmed, so as to provide for a reading, when there is an oil delivery to the oil tank, and also may detect, by periodic testing, a leaking of a single bubble tube.

In another embodiment, the apparatus may purge the single bubble tube and then directly, or after a short delay, receive a measuring sensing signal of the pressure-sensor means, and, optionally, the apparatus mat act as a self-diagnosing manner, to determine if there is a leak in the single-bubble-tube system. The apparatus acts as a self-diagnosis, by taking a second sensing signal of the pressure-sensor means a short time after the first measuring sensing signal; for example, 1 to 10 minutes later. The second signal then can be compared with the first measuring signal, to determine if there is a bubble-tube leak. A leak would be indicated by a difference in first and second sensing signals for greater than 1% to 2% of the first sensing signal.

The invention will be described for the purposes of illustration only, in connection with certain embodiments: however, it is recognized that various changes, modifications, improvements and additions may be made to the illustrated embodiments by those persons skilled in the art, without departing from the spirit and scope of the invention.

DESCRIPTION OF THE EMBODIMENTS

Figure 1:
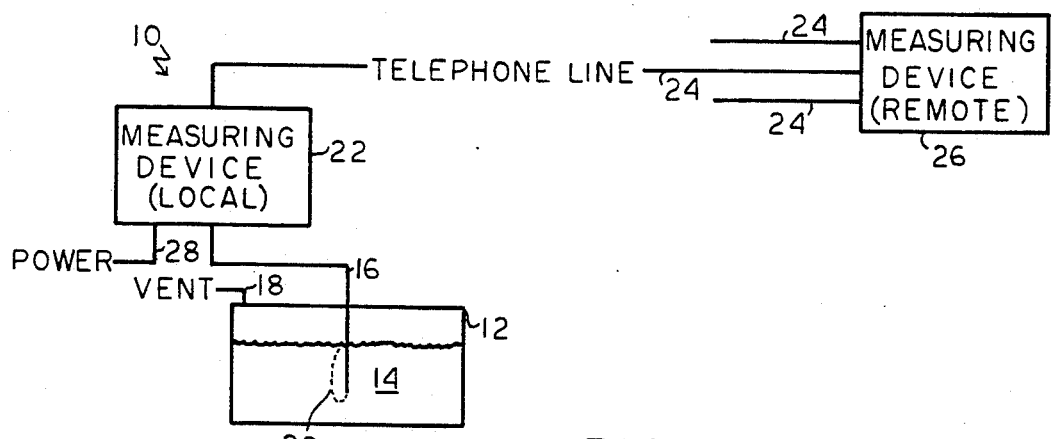
FIG. 1 is a schematic illustration of the system of the invention.

FIG. 1 is a schematic illustration of the system of the invention 10 showing an oil tank, such as a typical, residential, oil tank 12, containing oil 14 whose amount or level in the tank 12 is to be determined, with a single copper bubble tube 16 inserted in the tank, with the open end near the bottom, with purge air bubbles 20 shown emanating from the open end of the single bubble tube 16. The tank includes an air vent 18, and the single bubble tube 16 is connected to a local measuring device 22 typically adjacent to or near the tank, which is connected to a power source 28, and also is connected to a telephone line 24, which line is connected to a remote measuring device 26. The remote measuring device 26 can accommodate a plurality of telephone lines, so that they may monitor a plurality of tanks, and typically, for example, would be located in a central location; for example, by an oil supplier.

Figure 2:
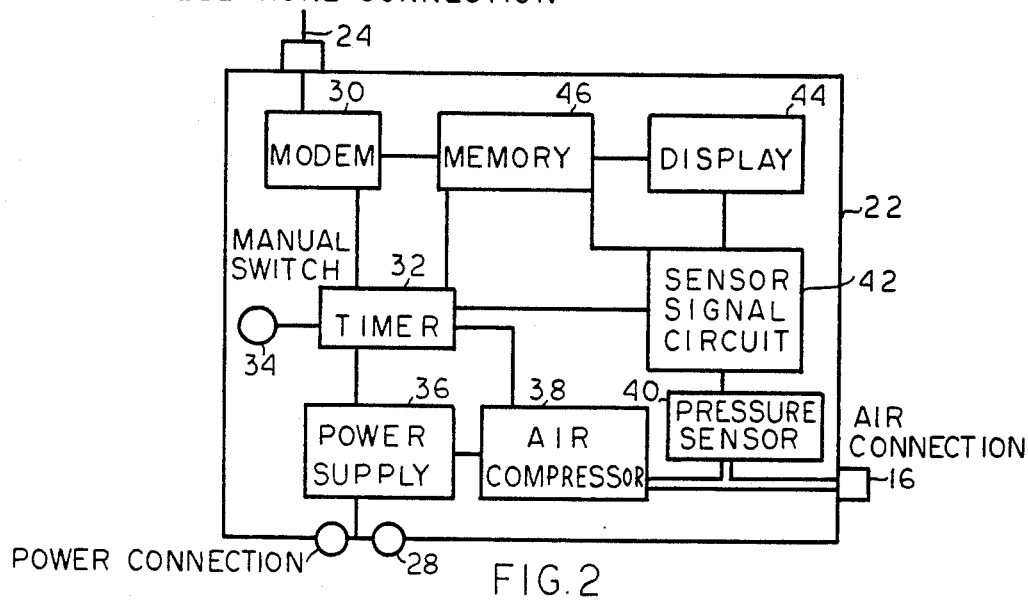
FIG. 2 is a block diagram of the local measuring device of FIG. 1.

FIG. 2 shows the local measuring device 22 containing a telephone connection for connection to the telephone line 24, and a power connection for connection to a 110-volt power source 28, and which includes therein a modem 30 which is connected to the telephone line 24 which receives and sends signals over the telephone line, such as pressure-sensor and timing signals. A memory 46, which stores information relating to the time and pressure signals, is connected to a display 44 which may comprise a visual display or be a printer or other type of readout device 44, wherein the measuring device 22 includes therein a timer 32, a manual switch 34 which overrides the timer, a power supply 36, such as a transformer, an integral, small, electrically powered, air compressor 38 and a pressure sensor 40, together with a pressure-sensor, signal circuit 42, with an air connection for the single bubble tube 16.

In operation, the local measuring device, either manually through manual switch 34 or the operation of timer 32, first operates the air compressor 38 through the power supply 36 connected to the air compressor and timer 32, to send a short burst of compressed air through the tube 36, to purge the line of oil within the tank for a short period of time; for example, 10 to 30 seconds, and, thereafter, the timer then actuates the pressure sensor 40 and the signal circuit 42 which senses the hydrostatic pressure immediately after the air bubbling has stopped, to relay a pressure-sensor signal relating to the level or amount of oil 14 in the tank 12. The memory for display, either then or later, is sent by the signal through the modem 30 in the telephone line 24 back to the remote measuring device 26. The calculation of the pressure sensor into the level or amount may be done by the sensor signal circuit 42, or, rather than put calculation circuits at the local measuring device, the calculation and the conversion of the analog to digital and digital to the recorded information can take place at the remote measuring device 26. The measuring device 22 thus permits the use of a single bubble tube 16 and the use of a short, interrupted air supply at the desired time frequency on demand, or immediately by the determination of the hydrostatic pressure by the pressure sensor 40, either to display one or both of the amount and level of oil 14 in the tank 12, or the signal may be transferred through the modem 30 to telephone line 24 to a remote measuring device 26 for calculation storage, and then returned through the telephone line 24 for storage in the local memory and display locally 46, 44.

Figure 3:
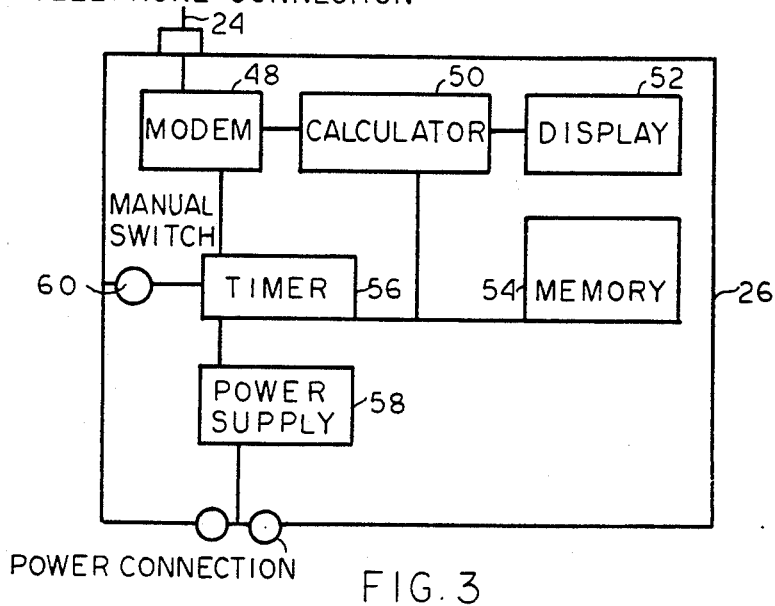
FIG. 3 is a block diagram of the remote measuring device of FIG. 1.

FIG. 3 is a block diagram of the remote measuring device which may be the same as or similar to the local measuring device 22, but without a sensor-signal circuit 42, the pressure sensor 40 and the air compressor 38. The remote measuring device 26 includes a telephone connection through line 24, a modem 48 to send and receive signals through the telephone line, a calculator 50 to receive the pressure-sensor signals and to do the necessary calculations as required, to convert the digital signals into a level or amount of oil in the tank 12, and then to a display 52 or to a memory 54 for inventory of time, level and amount. The remote measuring device 26 includes a timer 56, to provide for the time-sending of the signals over the telephone line, to actuate the local measuring device 22, as well as a manual override switch 60 for measuring on demand, as well as a power supply 58 to power the timer 56 and other components of the remote measuring device.

The remote measuring device 26 receives a signal from the local measuring device 22, over the telephone line 24 through the modem 48, converts the information through calculating circuits 50, and displays the information 52 and also stores in memory 54, all in response to time signals from timer 56 connected to the power supply 58, so that, for example, time signals can be sent through the timer 56, through modem 58, through line 24 to local measuring device 22, to actuate the timer and/or the air compressor 38, and then immediately thereafter the pressure sensor 40 and the sensor-signal circuits 42, so as to record the amount or level of oil 14 in the tank 12 as required, and then the information is stored in memory, displayed or sent through modem 48 back to the telephone line 24 to the remote measuring device.

The system and method of the invention thus provide for an easily installed, inexpensive, accurate system and method for measuring the amount or level of oil in an oil tank, both directly at the tank or at a remote location, to monitor a plurality of tanks.

What is claimed is:

1. A system for the determination of the amount of liquid such as fuel oil by a user at the local locations or at a remote location in a plurality of tanks, each a different local locations, which system comprises:
  a) a plurality of separate fuel oil tanks at different local locations, each tank having an air vent and containing a quantity of fuel oil whose amount within each tank is to be determined locally or at a remote location;
  b) a single bubble tube having a one and other end in each fuel oil tank with the one open end disposed near the bottom surface of each fuel oil tank;
  c) an electrically operated air compressor at each local location to provide compressed air to the other end of the single bubble tube on electrical actuation of the air compressor;
  d) a pressure-sensor means to sense the air pressure in the single bubble tube at each local location and to provide a pressure sensor signal;
  e) electrical circuitry means to convert the pressure sensor signal into an electrical signal on demand by a local user at the local locations or to transfer the signal to a remote central location on actuation;
  f) control means at each local location to actuate on demand either by a local user or by remote actuation or periodically at a fixed time period the air compressor to purge the single bubble tube with compressed air and to actuate the pressure sensor means;
g) means to actuate the control means which comprises:
  i) a telephone line extending between each local location and the remote central location;
  ii) a manual switch at each local location to permit actuation on demand by the local user;
h) means at a central remote location and connected to said telephone line to actuate the control means at each selected local location which comprises:
  i) a remote modem to receive and send pressure sensor and timing signals over the said telephone line between each local location and the remote location;
  ii) calculating, memory and display means at the remote location to calculate the amount of fuel oil at each local location from the pressure sensor signal, to store the pressure sensor signal from each local location and to display on actuation at the remote location or the local locations the calculated amount of fuel oil of one or more of the fuel oil tanks at the local locations; and
  iii) means to send a timing signal over the said telephone line from the remote location to actuate the control means at each local location.

2. The system of claim 1 which includes calculating means at each local location to calculate the amount of fuel oil from the pressure sensor signal.

3. The system of claim 1 wherein the control means at each local location provides a time period of about 15 to 120 seconds to actuate the air compressor.

4. The system of claim 1 wherein the control means at each local location provides a first pressure sensor signal and a second pressure signal after a selected time period for the same location and includes means to determine the difference, if any, in the first and second signal for the detection of a leak in the single bubble tube.

5. The system of claim 1 which includes means to calculate the amount of fuel oil from the pressure sensor signal at each local location and to display the calculated fuel oil amount on demand.

6. A method for the determination of the amount of fuel oil in a plurality of separate fuel oil tanks at local locations from a central remote location, which method comprises:
  a) inserting the open end of a single bubble tube into a vented fuel oil tank at each location, the open end of each single bubble tube placed adjacent the bottom of the fuel oil tank;
  b) introducing compressed air from an integral, electrically-operated air compressor at each local location into the open end of the single bubble tube for a short time period to purge the single bubble tube;
  c) detecting the hydrostatic pressure in the single bubble tube at each local location by a pressure sensor at each local location to obtain a first pressure sensor signal;
  d) converting the first pressure signal into a first signal representing the amount of fuel oil at each local location;
  e) actuating the air compressor by the user at each local location or by an actuating signal over a telephone line from a central remote location;
  f) transmitting the said first sensor signal to a central remote location over a telephone line;
  g) receiving, storing or displaying the first signal on demand by the user at each local location or at the central remote location by a remote operator to determine and monitor the amount of fuel oil at each local location.

7. The method of claim 6 which includes actuating the air compressor on demand by a local user through the manual operation of a switch at each local location.

8. The method of claim 7 which includes displaying on demand by the local user at each local location the amount of fuel oil in the fuel oil tank.

9. The method of claim 6 which includes actuating the air compressor at a selected local location by an actuation signal sent over a telephone line from a central remote location at periodic predetermined time periods and storing the sensor signal or amount of fuel oil in the selected fuel oil tank at the local location or at the central remote location.

10. The method of claim 6 which includes detecting the hydrostatic pressure in the single bubble tube to obtain a second pressure sensor signal at a selected local location shortly after obtaining a first pressure sensor signal, and comparing the first and second pressure sensor signals to determine if a leak exists in the single bubble tube.

11. The method of claim 10 which includes detecting the second pressure sensor signal about one to ten minutes after detecting the first pressure sensor signal.

12. The method of claim 6 which includes calculating the amount of fuel oil at the local location or at the control remote control location from the first signal and displaying the calculated amount of fuel oil at the local location or the central remote location.

13. A system for the determination of the amount of fuel oil by a user at the local locations or at a central remote location in a plurality of closed fuel oil tanks, each at different local locations, which system comprises:
  a) a plurality of separate fuel oil tanks at different local locations, each tank having an air vent and containing a quantity of fuel oil whose amount within each tank is to be determined locally or at a remote location;
  b) a single bubble tube having a one and other end in each fuel oil tank with the one open end disposed near the bottom surface of each fuel oil tank;
  c) an electrically operated air compressor at each local location to provide compressed air to the other end of the single bubble tube on electrical actuation of the air compressor;
  d) a pressure-sensor means to sense the air pressure in the single bubble tube at each local location and to provide a pressure sensor signal;
  e) electrical circuitry means to convert the pressure sensor signal into an electrical signal on demand by a local user at the local locations or to transfer the signal to a remote central location on actuation;
  f) control means at each local location to actuate on demand either by a local user or by remote actuation or periodically at a fixed time period the air compressor to purge the single bubble tube with compressed air;
  g) telephone line means extending between each local location and the central remote location;
  h) a modem at each local location to receive and send pressure sensor and timing signals over the telephone line means between the control remote location and each local locations;

i) a modem at the central remote location to receive and send pressure sensor or timing signals over the telephone line means between the control remote location and the local locations;

j) calculating means to calculate the amount of fuel oil at each selected local location from the pressure sensing signal at the local location or the central remote location; and k) display means to display at the local location or the central remote location the calculated amount of fuel oil in the fuel oil tank.

14. The system of claim 13 which includes memory and display means at the central remote location to store the pressure sensor signal from each local location and to display an activation at the central remote location or the selected local location the calculated amount of fuel oil of one or more fuel tanks at the local location.

15. The system of claim 13 which includes a timing means to send a timing signal over said telephone line means to activate the control means at the local location.

16. The system of claim 13 which includes a manual switch at the local location to provide activation of the control means by a local user.

17. The system of claim 13 which includes control means to send and receive a second pressure sensor signal a defined time period after the first pressure sensing signal and to compare the first and second signals to determine if a leak exists in the single bubble tube.

18. A system for the determination of the amount of fuel oil by a user at the local locations or at a remote location in a plurality of closed fuel oil tanks, each at different local locations, which system comprises in combination:

a) a plurality of separate, closed fuel oil tanks at different local locations, each tank having an air vent and containing a quantity of fuel oil whose amount within each tank is to be determined locally by the user at a remote location;

b) a single bubble tube having a one and other end in each fuel oil tank with the one open end disposed near the bottom surface of each fuel oil tank;

c) an electrically operated air compressor at each local location to provide compressed air to the other end of the single bubble tube at each local location on electrical actuation of the air compressor;

d) a pressure-sensor means to sense the air pressure in the single bubble tube at each local location and to provide a pressure sensor signal;

e) electrical circuitry means to convert the pressure sensor signal into an electrical signal for display on demand by a local user at the local locations or to transfer the signal to a remote central location on actuation;

f) timing means at each local location to actuate on demand either by a local user or by remote actuation or periodically at a fixed time period by timing signals the air compressor to purge the single bubble tube with compressed air and thereafter to actuate the pressure sensor means;

g) means to actuate the timing means which comprises:
 i) a telephone line extending between each local location and the remote central location;
 ii) a local modem to receive and send signals over the telephone line between the local location and the remote location;
 iii) memory and display means to store the pressure sensor signal and to display the calculated fuel oil amount on actuation; and
 iv) a manual switch at each local location to permit actuation on demand by the local user;

h) means at a central remote location and connected to said telephone line to actuate the timing means at each selected local location which comprises:
 i) a remote modem to receive and send pressure sensor and timing signals over the said telephone line between each location and the remote location;
 ii) calculating, memory and display means at the remote location to calculate the amount of fuel oil at each local location from the pressure sensor signal, to store the pressure sensor signal from each local location and to display on actuation at the remote location or the local locations the calculated amount of fuel oil of one or more of the fuel oil tanks at the local locations; and
 iii) means to send a timing signal over the said telephone line from the remote location to actuate the timing means at each local location.

19. A method for the determination of the amount of fuel oil in a plurality of separate fuel oil tanks at local locations from a central remote location, which method comprises:

a) inserting the open end of a single bubble tube into a vented fuel oil tank at each location, the open end of each single bubble tube placed adjacent the bottom of the fuel oil tank;

b) introducing compressed air from an integral, electrically-operated air compressor at each local location into the open end of the single bubble tube for a short time period to purge the single bubble tube;

c) detecting the hydrostatic pressure in the single bubble tube at each local location by a pressure sensor at each local location to obtain a first pressure sensor signal;

d) converting the first pressure signal into a first signal representing the amount of fuel oil at each local location;

e) actuating the air compressor by the user at each local location or by an actuating signal over a telephone line from a remote central location;

f) transmitting the said first sensor signal to a central remote location of a telephone line;

g) receiving, storing and displaying the first signal on demand by the user at each local location or at the remote central location by a remote operator to determine and monitor the amount of fuel oil at each local location.

* * * * *